(12) United States Patent
Wang

(10) Patent No.: US 11,915,067 B2
(45) Date of Patent: Feb. 27, 2024

(54) RESOURCE MANAGEMENT METHOD FOR NODE IN KUBERNETES, DEVICE, AND MEDIUM

(71) Applicant: INSPUR SUZHOU INTELLIGENT TECHNOLOGY CO., LTD., Jiangsu (CN)

(72) Inventor: Dekui Wang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/801,897

(22) PCT Filed: Oct. 27, 2020

(86) PCT No.: PCT/CN2020/123800
§ 371 (c)(1),
(2) Date: Aug. 24, 2022

(87) PCT Pub. No.: WO2021/169342
PCT Pub. Date: Sep. 2, 2021

(65) Prior Publication Data
US 2023/0084772 A1    Mar. 16, 2023

(30) Foreign Application Priority Data
Feb. 24, 2020    (CN) .......................... 202010112361.0

(51) Int. Cl.
*G06F 9/54* (2006.01)
*G06F 9/50* (2006.01)

(52) U.S. Cl.
CPC ............ *G06F 9/547* (2013.01); *G06F 9/5016* (2013.01)

(58) Field of Classification Search
CPC ...... G06F 9/547; G06F 9/5016; G06F 9/5027; G06F 11/3024; G06F 15/7803; Y02D 10/00
See application file for complete search history.

(56) References Cited

U.S. PATENT DOCUMENTS

| | | | |
|---|---|---|---|
| 10,791,063 B1 * | 9/2020 | Florissi | H04L 47/783 |
| 2004/0158777 A1 * | 8/2004 | Bae | G06F 11/203 |
| | | | 714/2 |

(Continued)

FOREIGN PATENT DOCUMENTS

| | | |
|---|---|---|
| CN | 103744643 A | 4/2014 |
| CN | 106027643 A | 10/2016 |

(Continued)

OTHER PUBLICATIONS

International Search Report cited in PCT application PCT/CN2020/123800, dated Dec. 30, 2020, 6 pages.

(Continued)

*Primary Examiner* — Kevin L Young
*Assistant Examiner* — Phuong N Hoang
(74) *Attorney, Agent, or Firm* — Cooper Legal Group LLC

(57) ABSTRACT

A resource management method for a node in Kubernetes, a computer device, and a readable storage medium. The method includes following steps: initializing a component to start a main process; defining, by means of the main process, subprocesses for managing resources respectively; in response to a detection from the main process that a plurality of actual resources is present in a node among the resources, starting a subprocess corresponding to each of the actual resources, and starting gRPC service for each started subprocess; and registering the resources corresponding to a subprocesses where the gRPC service is successfully started to Kubernetes by using the main process enabling the (Continued)

subprocesses where the gRPC service is successfully started to manage the actual resources.

17 Claims, 4 Drawing Sheets

(56) References Cited

U.S. PATENT DOCUMENTS

| | | | |
|---|---|---|---|
| 2019/0102226 A1* | 4/2019 | Caldato | G06F 8/60 |
| 2020/0012526 A1 | 1/2020 | Bianchini et al. | |
| 2020/0027210 A1* | 1/2020 | Haemel | G06F 9/5038 |
| 2020/0050487 A1* | 2/2020 | Garla | G06F 9/5061 |
| 2020/0117525 A1* | 4/2020 | Kachare | G06F 9/547 |
| 2020/0267212 A1* | 8/2020 | Chatt | H04L 47/828 |
| 2020/0301782 A1* | 9/2020 | Radhakrishnan | G06F 11/1415 |
| 2020/0310881 A1* | 10/2020 | Gonzalez | G06F 9/5027 |
| 2020/0401452 A1* | 12/2020 | Piercey | G06F 9/5016 |
| 2021/0314388 A1* | 10/2021 | Zhou | G06F 9/54 |
| 2021/0382728 A1* | 12/2021 | Chan | G06F 9/5027 |

FOREIGN PATENT DOCUMENTS

| | | |
|---|---|---|
| CN | 106776005 A | 5/2017 |
| CN | 110445669 A | 11/2019 |
| CN | 110515704 A | 11/2019 |
| CN | 110780998 A | 2/2020 |
| CN | 111367659 A | 7/2020 |
| WO | 2018192543 A | 10/2018 |

OTHER PUBLICATIONS

Written Opinion of International Searching Authority of corresponding PCT application PCT/CN2020/123800, dated Dec. 30, 2020, 9 pages.

Notice of Grant of corresponding CN priority application CN202010112361.6, dated Jun. 15, 2022, 2 pages.

* cited by examiner

RESOURCE MANAGEMENT METHOD FOR NODE IN KUBERNETES, DEVICE, AND MEDIUM

This application is the national phase application of International Application No. PCT/CN2020/123800, filed Oct. 27, 2020, which claims priority to Chinese Patent Application No. 202010112361.0, filed on Feb. 24, 2020, in China National Intellectual Property Administration and entitled "Resource Management Method for Node in Kubernetes, Device, and Medium", the contents of each of which are hereby incorporated by reference in its entirety.

FIELD

The present disclosure relates to a field of Process Control Blocks (PCBs), and particularly to a resource management method for a node in Kubernetes, a device, and a storage medium.

BACKGROUND

Kubernetes becomes a mainstream open source project in a field of container management by virtue of a resource management mechanism provided thereof. The Kubernetes natively provides a management mechanism for three types of resources of Central Processing Unit (CPU), memory, and hard disk. To meet requirements of different users for resource type extension, the Kubernetes also provides a mechanism called device plug-in to allow the users to implement operations of registration, allocation, reclaiming, etc., of a third-party resource through an interface defined by the device plug-in. A device plug-in mechanism may implement allocation of such resources only by specifying a name of a third-party resource during creation of a container created by the user, and then such resources may be used for calculation of a newly created container.

In a field of Artificial Intelligence (AI), the Kubernetes is gradually configured as a resource manager. Besides the three types of resources of basic CPU, memory, and hard disk, Graphics Processing Unit (GPU), Field-Programmable Gate Array (FPGA), Application Specific Integrated Circuit (ASIC), InfiniBand, and other resources, as well as customized resource types that meet service requirements are also usually required in an AI scenario. These resources may be managed by the Kubernetes based on the device plug-in mechanism of the Kubernetes. The device plug-in mechanism of the Kubernetes usually needs a component for a type of resources to complete management of this type of resources. When a node in the AI scenario needs four types of resources of GPU, FPGA, ASIC, and InfiniBand, four components need to be deployed in the node. When a cluster has a large number of nodes, the four components need to be deployed in each node. As each component needs to occupy a part of resources of the node, and a complexity of an operation and maintenance of a system has been increased, in the AI scenario, training speeds of many training tasks may be increased by use of all resources of the node. Therefore, a mechanism is needed to reduce a resource consumption for the operation of such a component, release more resources for the training tasks, and reduce the complexity in system operation and maintenance.

SUMMARY

In view of this, to solve at least one of the foregoing problems, embodiments of the present disclosure disclose a resource management method for a node in Kubernetes, including the following steps:

initializing a component to start a main process;

defining, by means of the main process, a plurality of subprocesses for managing a plurality of resources respectively;

in response to a detection from the main process that a plurality of actual resources is present in a node among the a plurality of resources, starting a subprocess corresponding to each of the plurality of actual resources, and starting Google Remote Procedure Call (gRPC) service for each started subprocess; and registering the resources, corresponding to a subprocesses where the gRPC service is successfully started, to Kubernetes by means of the main process, enabling the subprocesses where the gRPC service is successfully started to manage the plurality of actual resources.

In some embodiments, the defining, by means of the main process, a plurality of subprocesses for managing a plurality of resources respectively further includes:

defining, by means of the main process, resource names and attributes of preset resource processing interfaces for the plurality of subprocesses respectively.

In some embodiments, the enabling the subprocesses where the gRPC service is successfully started to manage the plurality of actual resources further includes: in response to a request, received from a Kubelet component in the Kubernetes, to apply for a resource for a container, allocating, by a subprocess corresponding to a resource to be applied for, the resource to be applied for to the container by the gRPC service.

In some embodiments, the method further includes:

recording, by means of the main process, a correspondence between the container and an allocated resource to be applied for; and generating a persistent file from the correspondence, and storing the persistent file to the node.

In some embodiments, the initializing a component to start a main process further includes:

loading the persistent file to acquire a correspondence between a resource and a container of the node.

In some embodiments, the method further includes:

starting gRPC service for the main process; and querying, by use of the gRPC service of the main process, resource utilization information of the node.

In some embodiments, the method further includes:

detecting, periodically in the node, a resource corresponding to a subprocess that is not started.

In some embodiments, the starting gRPC service for each started subprocess further includes:

storing, locally in the node, a socket file corresponding to a subprocess where the gRPC service is successfully started; and monitoring, by the main process based on a plurality of socket files, states of the subprocesses where the gRPC service is successfully started.

Based on the same inventive concept, according to a further aspect of the present disclosure, the embodiments of the present disclosure also provide a computer device, including:

at least one processor; and a memory storing a computer program capable of running in the processor, characterized in that the processor executes the program to execute any steps of the resource management method for a node in Kubernetes.

Based on the same inventive concept, according to a further aspect of the present disclosure, the embodiments of the present disclosure also provide a computer-readable storage medium, storing a computer program that is executable by a processor to implement any steps of the resource management method for a node in Kubernetes.

The present disclosure has one of the following beneficial technical effects. The solution disclosed in the present disclosure is highly extensible, and more types of resources may be supported to be registered to the Kubernetes without increasing the number of system components and bringing any extra resource consumption and increase of the complexity in system operation and maintenance.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those ordinarily skilled in the art may further obtain other embodiments according to these drawings without creative work.

DETAILED DESCRIPTION

In order to make objectives, technical solutions, and advantages of the present disclosure clearer, embodiments of the present disclosure will further be described below in detail in combination with specific embodiments and with reference to drawings.

It is to be noted that all expressions made with "first", "second", etc., in the embodiments of the present disclosure are for distinguishing two different entities or parameters with a same name, and thus it can be seen that "first" and "second" are only for ease of description and should not be understood as limitations on the embodiments of the present disclosure. No descriptions are made thereto in the following embodiments.

Figure 1:
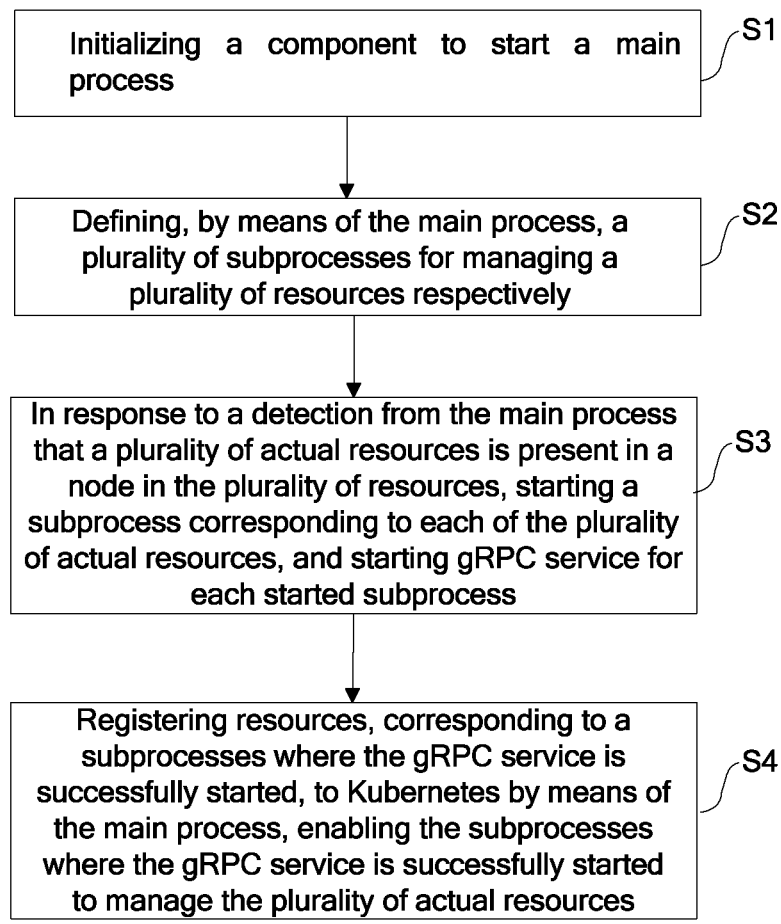
FIG. 1 is a schematic flowchart of a resource management method for a node in Kubernetes according to an embodiment of the present disclosure.

According to an aspect of the present disclosure, the embodiments of the present disclosure disclose a resource management method for a node in Kubernetes. As shown in FIG. 1, the method may include following steps. In S1, a component is initialized to start a main process. In S2, a plurality of subprocesses for managing a plurality of resources respectively are defined by means of the main process. In S3, in response to a detection from the main process that a plurality of actual resources is present in a node among the a plurality of resources, a subprocess corresponding to each of the actual resources is started, and gRPC service is started for each started subprocess. In S4, the resources corresponding to a subprocesses where the gRPC service is successfully started are registered to Kubernetes by using the main process, enabling the subprocesses where the gRPC service is successfully started to manage the plurality of actual resources.

In a solution disclosed in the present disclosure, a resource registration component is defined based on a device plug-in extension mechanism of the Kubernetes. Resource device plug-ins are integrated into the component based on mechanisms of a multiple process, a gRPC communication, a file monitoring and management, etc. In addition, a process state monitoring mechanism is provided to ensure a normal operation of a management process for each type of resources. Based on this component, resources may be registered to Kubernetes, and resources may be allocated, thereby reducing the number of system components while reducing a complexity of system operation and maintenance.

Figure 2:
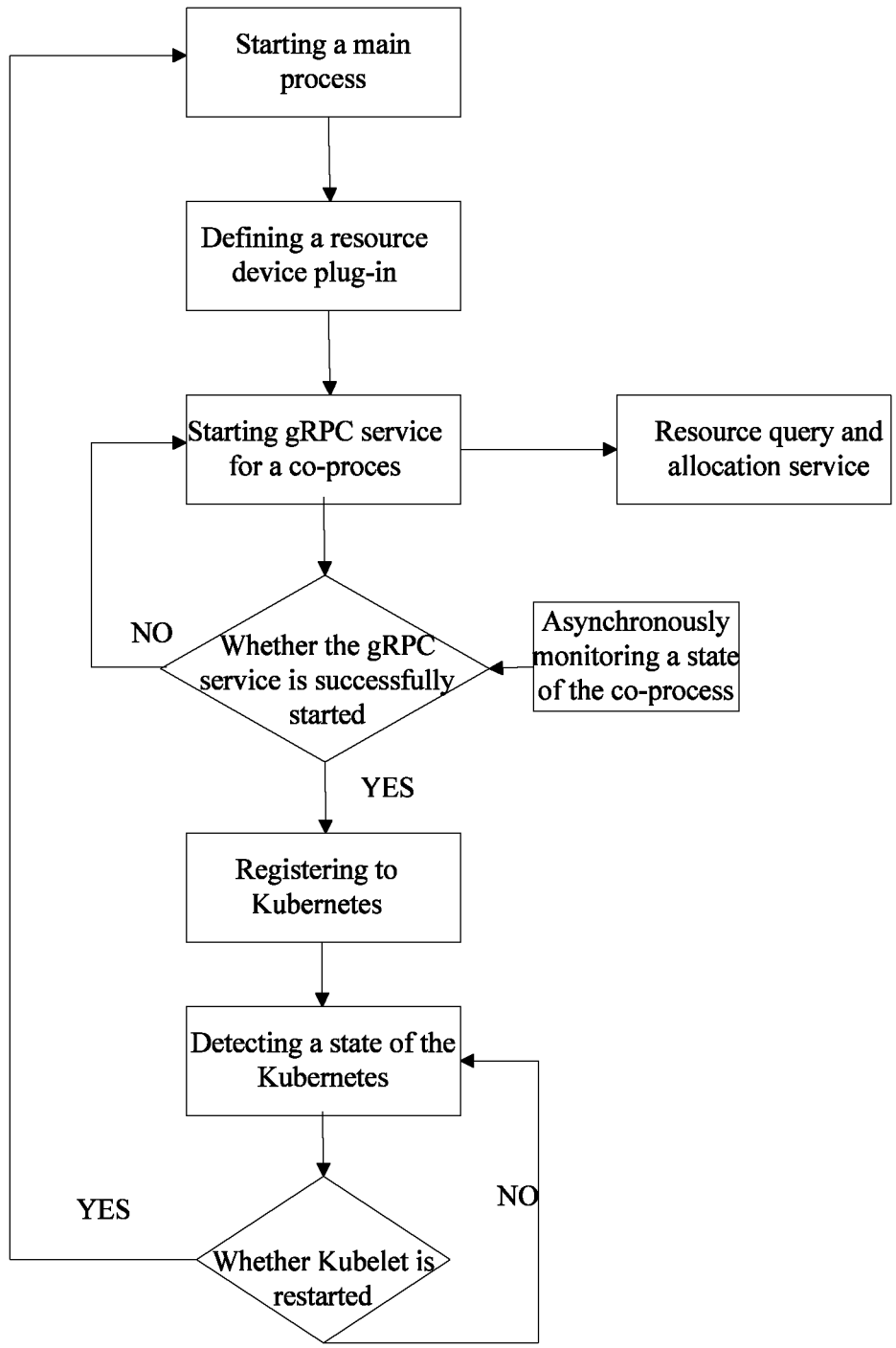
FIG. 2 is a flow block diagram of the resource management method according to an embodiment of the present disclosure.

In some embodiments, as shown in FIG. 2, when the component is started, a main process is defined. Meanwhile, a subprocess is started for each type of resources (namely a resource device plug-in is defined), and a query and allocation mode for each type of resources is defined for the subprocess for this type of resources by use of the main process according to an interface of the device plug-in in the Kubernetes. The main process of the component may provide unified Kubernetes resource registration and subprocess state management. When an AI cluster is constructed, it is only necessary to deploy the component in each node. The main process of the component may register multiple types of resources to the Kubernetes for management by means of the subprocesses for managing various types of resources respectively, including registering to the Kubernetes, starting the gRPC service, stopping the gRPC service, and recovering the gRPC service abnormally. When a Kubelet component of the Kubernetes allocates a resource to a container, an interface of the component is called to complete resource allocation and binding with the container. Therefore, the number of system components is reduced, and the complexity in operation and maintenance is reduced.

In some embodiments, the operation in step S2 that the subprocesses for managing the resources respectively are defined by means of the main process further includes a following step:

resource names and attributes of preset resource processing interfaces are defined for the subprocesses by means of the main process respectively.

In some embodiments, in an initialization phase of the component, co-processes for each type of resource may be defined by means of the main process (namely the subprocesses are defined). A resource name corresponding to each subprocess and a resource processing interface required by the device plug-in are defined. Wherein interfaces mainly include four interfaces required by the device plug-in mechanism of Kubernetes (GetDevicePluginOptions, PreStartContainer, ListAndWatch, and Allocate), and data information needed by these interfaces.

In some embodiments, in step S3, the subprocess corresponding to each of the actual resources is started in response to the detection from the main process that the actual resources is present in a node in the resources. In some embodiments, after the component is initialized to start the main process, the main process may automatically detect a resource type that the node already has through a corresponding detection function. For example, when the node has a GPU resource, whether the GPU is present in the node is confirmed through an NVIDIA Management Library (NVML) provided by Nvidia. When the node has an Information Button (IB) card device, whether the IB card device is present in the node may be determined through a Remote Direct Memory Access Protocol (RDMAP) function library. In this way, when an existing resource type is detected, a subprocess corresponding to the type of resource may be started.

In some embodiments, the method further includes a following step:

a resource corresponding to a subprocess that is not started is detected periodically in the node.

In some embodiments, when the existing resource type is not detected in the node, a periodic detection process is started. When a resource type is detected, the co-process corresponding to this type of resource is started.

It is to be noted that the subprocess is defined by means of the main process in the initialization phase of the component. A corresponding subprocess is started only when the corresponding resource is detected in the node. If some resources are not present in the node, subprocesses corresponding to these resources are not started. The subprocess that is not started before is started only when the periodic detection process detects the corresponding resource.

Figure 3:
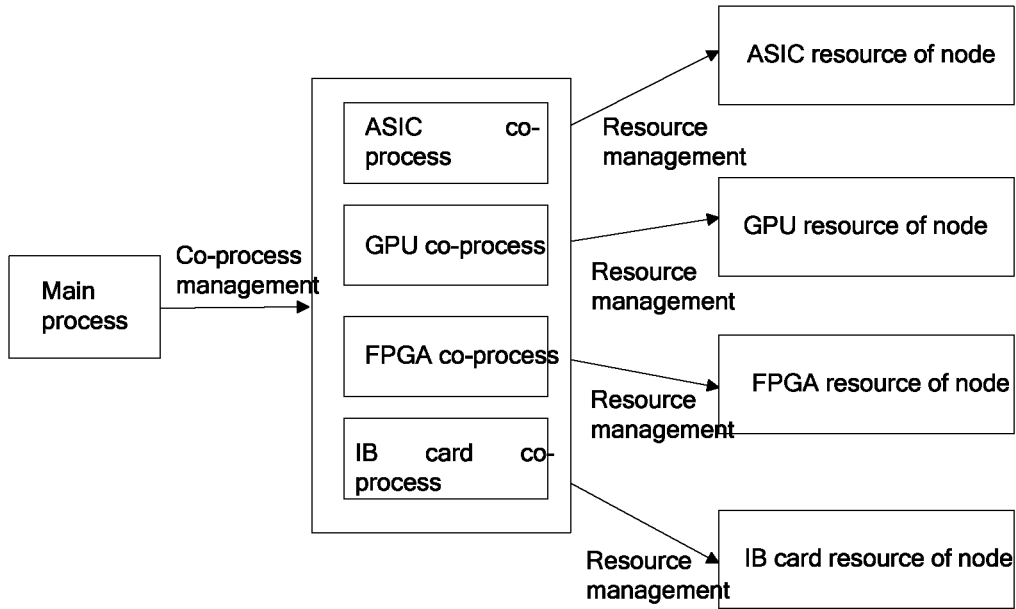
FIG. 3 is a block diagram of a relationship between a main process, subprocesses for each type of resource, and a node resource.

For example, after the subprocesses are started, a relationship between the main process, the co-processes (subprocesses) for each type of resource, and the host resources may be as shown in FIG. 3. The co-processes may be managed by the main process. Each co-process may manage corresponding resources. The main process shown in FIG. 3 may manage an ASIC co-process, a GPU co-process, an FPGA co-process, and an IB card co-process, and these co-processes may manage corresponding ASIC resources, GPU resources, FPGA resources, and IB card resources. As such, device plug-in implementation of managing various types of resources by means of subprocesses may be implemented, and each subprocess manages a type of resources in the host.

In some embodiments, that gRPC service is started for each started subprocess in step S3 further includes following steps:

a socket file corresponding to the subprocess successfully starting the gRPC servicer is stored locally in the node; and the main process monitors, based on a plurality of socket files, states of the subprocesses successfully starting the gRPC service.

In some embodiments, the device plug-in implementation of the subprocess for managing each type of resource may be implemented through the gRPC service. Wherein the gRPC service needs to be started for each subprocess, and a socket file corresponding to this subprocess are stored locally. For example, for a GPU resource, the socket file may be defined as /var/lib/kubelet/device-plugins/gpu.sock, and the main process of the component may monitor a state of the subprocess based on this file. In addition, as shown in FIG. 2, each subprocess may also implement resource allocation management through the gRPC service.

In some embodiments, that the subprocesses that the gRPC service is successfully started for are enabled to manage the plurality of actual resources in step S4 further includes a following step:

in response to a request, received from a Kubelet component in the Kubernetes, to apply for a resource for the container, the subprocess corresponding to the resource to be applied for allocates the resource to be applied for to the container by means of the gRPC service.

In some embodiments, after a service layer creates the container, when these resources are needed to use, it is still necessary to only install an original mode for applying for resources in the Kubernetes. For example, when the container needs the GPU resource, the Kubelet component in the Kubernetes applies for the GPU resource for the container. Then, the Kubelet component calls the component disclosed in the embodiments of the present disclosure to allocate the GPU resource to the container.

In some embodiments, the method further includes following steps:

a correspondence between the container and the allocated resource to be applied for is recorded by means of the main process; and a persistent file is generated from the correspondence, and the persistent file is stored to the node.

Figure 4:
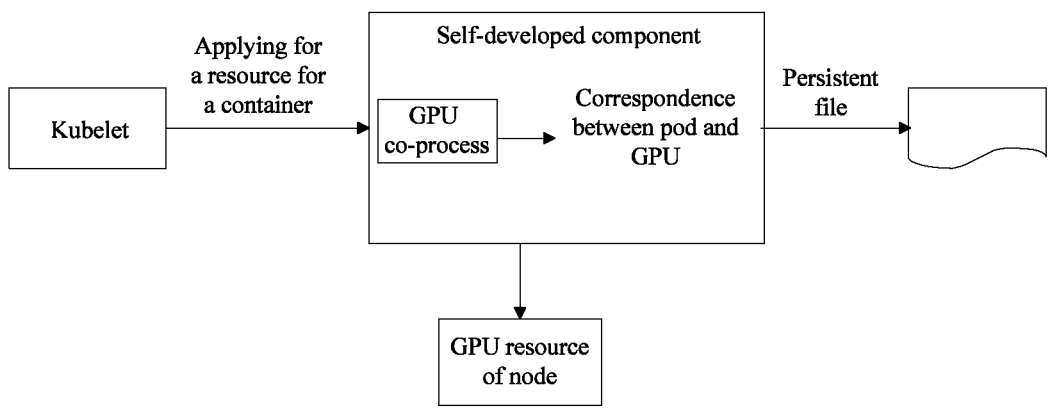
FIG. 4 is a flow block diagram when Kubelet calls a component disclosed in an embodiment of the present disclosure.

In some embodiments, as shown in FIG. 4, when Kubelet calls the component disclosed in the embodiments of the present disclosure to allocate the resource to the container, a correspondence between the resource and the container is recorded and persistently stored to a local file by the component. In FIG. 4, a pod is a minimum unit in the Kubernetes. Each pod includes one or more containers. A correspondence between a resource and the pod may be recorded to record a correspondence between the resource and a container in the pod.

In some embodiments, that a component is initialized to start the main process in step S1 further includes a following step:

the persistent file is loaded to acquire a correspondence between a resource and a container of the node.

As shown in FIG. 2, after the state of Kubernetes is detected, it is necessary to restart the Kubelet component. At this point, it is also necessary to restart the main process, namely initializing the component disclosed in the embodiments of the present disclosure. Then, when the component is initialized and the main process is started, a local file is loaded first to recover a correspondence between a resource of the node and a container. In this way, the correspondence between the resource of the host node and the container is queried to complete summarizing a resource utilization condition of the node, thereby making it more convenient to operate and maintain the node and troubleshooting resource utilization during use of a cluster.

In some embodiments, the method further includes following steps:

gRPC service is started for the main process; and resource utilization information of the node is queried by use of the gRPC service of the main process.

In some embodiments, after the gRPC service is started for the main process of the component, a third party may query a resource utilization condition of the node. For example, containers using GPU resources, containers using IB cards, containers using FPGAs, and other information may be acquired.

According to a solution disclosed in the present disclosure, when resources needed by AI training are managed based on the Kubernetes in an AI scenario, through a new resource registration management mechanism self-developed, the resources may be registered and allocated by use of only one self-developed component. Based on the mechanism, the number of system components in an AI cluster may be reduced effectively. A plurality of components may be integrated into one component without affecting the management of a plurality of resources by Kubernetes. Therefore, the resource occupation rate of the system component is reduced, and more resources are released for AI training tasks. In addition, based on the component, resource types present in the node may be obtained automatically, and a query interface for a resource utilization condition of the node may be provided. Therefore, the solution disclosed in the present disclosure is highly extensible, and more types of resources may be supported to be registered to the Kubernetes without increasing the number of system components and bringing any extra resource consumption and increase of the complexity in the system operation and maintenance.

Figure 5:
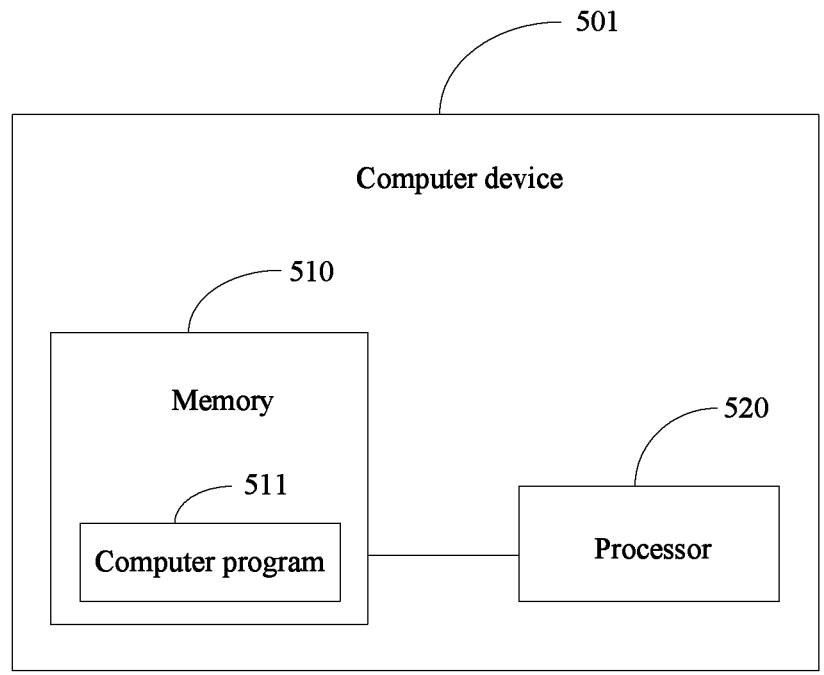
FIG. 5 is a schematic structural diagram of a computer device according to an embodiment of the present disclosure.

Based on the same inventive concept, according to a further aspect of the present disclosure, as shown in FIG. 5, the embodiments of the present disclosure also provide a computer device 501, including:

at least one processor 520; and a memory 510 storing a computer program 511 capable of running in the processor. The processor 520 executes the program to execute any steps of the resource management method for a node in Kubernetes.

Figure 6:
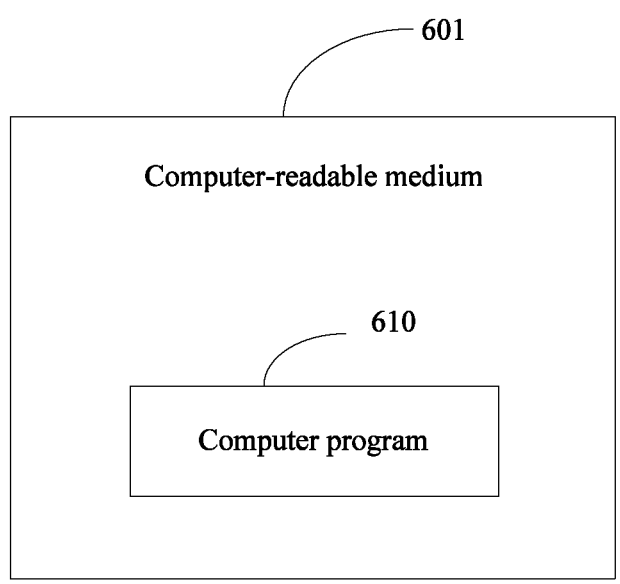
FIG. 6 is a schematic structural diagram of a computer-readable storage medium according to an embodiment of the present disclosure.

Based on the same inventive concept, according to a further aspect of the present disclosure, as shown in FIG. 6, the embodiments of the present disclosure also provide a computer-readable storage medium 601, storing a computer program instruction 610 that is executed by a processor to implement any steps of the resource management method for a node in Kubernetes.

It is finally to be noted that those ordinarily skilled in the art can understand that all or part of the flows in the method of the above-mentioned embodiments may be completed by a computer program by instructing related hardware. The program may be stored in a computer-readable storage medium. When the program is executed, the flows of each method embodiment may be included. The storage medium may be a magnetic disk, an optical disk, a Read-Only Memory (ROM), a Random Access Memory (RAM), etc. The embodiments of the computer program may have effects the same as or similar to those in any corresponding method embodiment.

In addition, typically, the apparatus, device, etc., disclosed in the embodiments of the present disclosure may be various electronic terminal devices such as a mobile phone, a Personal Digital Assistant (PDA), a PAD, and a smart television, or may be a large terminal device such as a server. Therefore, the scope of protection disclosed in the embodiments of the present disclosure should not be limited to apparatuses and devices of a specific type. The client disclosed in the embodiments of the present disclosure may be applied to any above-mentioned electronic terminal device in form of electronic hardware, computer software, or a combination thereof.

In addition, the method disclosed according to the embodiments of the present disclosure may also be implemented as a computer program executed by a CPU. The computer program may be stored in a computer-readable storage medium. When the computer program is executed by the CPU, the functions defined in the method disclosed in the embodiments of the present disclosure are executed.

Moreover, each method step and system unit may also be implemented by a controller and a computer-readable storage medium configured to store a computer program that enables the controller to implement the steps or functions of the units.

Furthermore, it is to be understood that the computer-readable storage medium (such as a memory) herein may be a volatile memory or a nonvolatile memory, or may include both a volatile memory and a nonvolatile memory. As an example rather than restriction, the nonvolatile memory may include a ROM, a Programmable ROM (PROM), an Electrically PROM (EPROM), an Electrically Erasable PROM (EEPROM), or a flash memory. The volatile memory may include a RAM that may be used as an external cache memory. As an example rather than restriction, the RAM may be obtained in various forms, such as a Synchronous RAM (SRAM), a Dynamic RAM (DRAM), a Synchronous DRAM (SDRAM), a Double Data Rate SDRAM (DDR SDRAM), an Enhanced SDRAM (ESDRAM), a Synchronous Link DRAM (SLDRAM), and a Direct Rambus RAM (DRRAM). The storage device in the disclosed aspect is intended to include, but not limited to, these or other proper types of memories.

It is also understood by those skilled in the art that various exemplary logic blocks, modules, circuits, and algorithm steps described in combination with the disclosure herein may be implemented as electronic hardware, computer software, or a combination thereof. For ease of description about such interchangeability of hardware and software, functions of various schematic components, blocks, modules, circuits, and steps are described generally. Whether these functions are implemented as software or hardware depends on specific applications and design constraints on the whole system. Those skilled in the art may realize the functions for each specific application in various manners, but such realization should not be explained as resulting in departure from the scope disclosed in the embodiments of the present disclosure.

Various exemplary logic blocks, modules, and circuits described in combination with the disclosure herein may be implemented or executed by the following components designed to execute the functions herein: a general-purpose processor, a Digital Signal Processor (DSP), an ASIC, an FPGA or another programmable logic device, a discrete gate or transistor logic, a discrete hardware component, or any combination thereof. The general-purpose processor may be a microprocessor. Alternatively, the processor may be any conventional processor, controller, microcontroller, or state machine. Alternatively, the processor may be implemented as a combination of computing devices, such as a combination of a DSP and a microprocessor, multiple microprocessors, a combination of one or more microprocessors and a DSP, and/or any other such configuration.

The steps of the method or algorithm described in combination with the disclosure herein may be directly included in hardware, a software module executed by the processor, or a combination thereof. The software module may be located in a RAM, a flash memory, a ROM, an EPROM, an EEPROM, a register, a hard disk, a removable disk, a Compact Disc ROM (CD-ROM), or a storage medium of any other form well known in this art. The storage medium is exemplarily coupled to the processor such that the processor may read information from the storage medium or write information to the storage medium. In an alternative solution, the storage medium may be integrated with the processor. The processor and the storage medium may be located in an ASIC. The ASIC may be located in a user terminal. In an alternative solution, the processor and the storage medium may be located in a user terminal as discrete components.

In one or more exemplary designs, the function may be realized in hardware, software, firmware, or any combination thereof. If being realized in software, the function may be stored in a computer-readable medium or transmitted through the computer-readable medium as one or more instructions or codes. The computer-readable medium includes a computer storage medium and a communication medium. The communication medium includes any medium that helps transmit a computer program from one position to another. The storage medium may be any available medium accessible for a general-purpose or special-purpose computer. As an example rather than restriction, the computer-readable medium may include a RAM, a ROM, an EEPROM, a CD-ROM or another optical disc storage device, a disk storage device or another magnetic storage device, or any other medium available for carrying or storing a needed program code in form of an instruction or a data structure and accessible for a general-purpose or special-purpose computer or a general-purpose or special-purpose processor. In addition, any connection may be referred to as a computer-readable medium as appropriate. For example, if a coaxial cable, a fiber optic cable, a twisted pair, a Digital Subscriber Line (DSL), or a wireless technology like infrared, radio, and microwave is used to send software from a website, a server, or another remote source, the coaxial cable, the fiber optic cable, the twisted pair, the DSL, or the wireless technology like infrared, radio, and microwave is included in the definition of the medium. As used herein, the magnetic disk and the optical disc include a Compact Disc (CD), a laser disc, an optical disc, a Digital Versatile Disc (DVD), a floppy disc, and a blue-ray disc. Generally, the magnetic disk magnetically reproduces data, while the optical disc optically reproduces data using laser. Combinations of the above-mentioned contents should also be included in the scope of the computer-readable medium.

The above is the exemplary embodiment disclosed in the present disclosure. However, it is to be noted that various variations and modifications may be made without departing from the scope defined in the claims and disclosed in the embodiments of the present disclosure. The functions, steps, and/or actions in the method claims according to the disclosed embodiments described herein are not required to be executed in any specific sequence. In addition, the element disclosed in the embodiments of the present disclosure may be described or required in an individual form, but may be understood as a plural form, unless clearly limited to a singular form.

It is to be understood that, as used herein, the singular form "a/an" is intended to include the plural form also, unless exceptional cases are supported clearly in the context. It is also to be understood that "and/or" used herein refers to including any or all possible combinations of one or more than one item that is listed associatively.

The sequence numbers of the embodiments of the present disclosure are only for description and do not represent superiority-inferiority of the embodiments.

It can be understood by those ordinarily skilled in the art that all or part of the steps of the above-mentioned embodiments may be completed by hardware, or by a program by instructing related hardware. The program may be stored in a computer-readable storage medium. The above-mentioned storage medium may be a ROM, a magnetic disk, an optical disk, or the like.

It is to be understood by those ordinarily skilled in the art that discussions about any above embodiment are only exemplary and not intended to imply that the scope (including the claims) disclosed in the embodiments of the present disclosure is limited to these examples. Under the concept of the embodiments of the present disclosure, the above embodiments or technical features in different embodiments may also be combined, and there are many other variations of different aspects of the embodiments of the present disclosure, which are not provided in details for brevity. Therefore, any omissions, modifications, equivalent replacements, improvements, etc., made within the spirit and principle of the embodiments of the present disclosure shall fall within the scope of protection of the embodiments of the present disclosure.

The invention claimed is:

1. A resource management method for a node in a resource manager, comprising:
    initializing a component to start a main process;
    defining, by means of the main process, a plurality of subprocesses for managing a plurality of resources respectively;
    in response to a detection from the main process that a plurality of actual resources is present in a node among the plurality of resources, starting a subprocess corresponding to each of the plurality of actual resources, and starting Remote Procedure Call (RPC) service for each started subprocess; and
    registering resources, corresponding to a subprocess where the RPC service is successfully started, to the resource manager by means of the main process, enabling the subprocess where the RPC service is successfully started to manage the plurality of actual resources;
    wherein the defining, by means of the main process, a plurality of subprocesses for managing a plurality of resources respectively further comprises:
        defining, by means of the main process, resource names and attributes of preset resource processing interfaces for the plurality of subprocesses respectively.

2. The method according to claim 1, wherein the enabling the subprocess where the RPC service is successfully started to manage the plurality of actual resources further comprises:
    in response to a request, received from the resource manager, to apply for a resource for a container, allocating, by a subprocess corresponding to a resource to be applied for, the resource to be applied for to the container by the RPC service.

3. The method according to claim 2, further comprising:
    recording, by means of the main process, a correspondence between the container and an allocated resource to be applied for; and
    generating a persistent file from the correspondence, and storing the persistent file to the node.

4. The method according to claim 3, wherein the initializing a component to start a main process further comprises:
    loading the persistent file to acquire a correspondence between a resource and a container of the node.

5. The method according to claim 3, further comprising:
    starting RPC service for the main process; and
    querying, by use of the RPC service of the main process, resource utilization information of the node.

6. The method according to claim 1, further comprising:
    detecting, periodically in the node, a resource corresponding to a subprocess that is not started.

7. The method according to claim 1, wherein the starting RPC service for each started subprocess further comprises:
    storing, locally in the node, a socket file corresponding to the subprocess where the RPC service is successfully started; and
    monitoring, by the main process based on a plurality of socket files, states of the subprocess where the RPC service is successfully started.

8. A computer device, comprising:
    at least one processor; and
    a memory storing a computer program configured to run in the at least one processor, wherein the at least one processor executes the computer program to:

initialize a component to start a main process;
define, by means of the main process, a plurality of subprocesses for managing a plurality of resources respectively;
in response to a detection from the main process that a plurality of actual resources is present in a node among the plurality of resources, start a subprocess corresponding to each of the plurality of actual resources, and start Remote Procedure Call (RPC) service for each started subprocess; and
register resources, corresponding to a subprocess where the RPC service is successfully started, to a resource manager by means of the main process, enabling the subprocess where the RPC service is successfully started to manage the plurality of actual resources;
wherein the at least one processor further executes the computer program to:
define, by means of the main process, resource names and attributes of preset resource processing interfaces for the plurality of subprocesses respectively.

9. The computer device according to claim 8, wherein in order to enable the subprocess where the RPC service is successfully started to manage the plurality of actual resources, the at least one processor, upon execution of the computer program, is configured to:
in response to a request, received from the resource manager, to apply for a resource for a container, allocate, by a subprocess corresponding to a resource to be applied for, the resource to be applied for to the container by the RPC service.

10. The computer device according to claim 9, wherein the at least one processor, upon execution of the computer program, is configured to:
record, by means of the main process, a correspondence between the container and an allocated resource to be applied for; and
generate a persistent file from the correspondence, and store the persistent file to the node.

11. The computer device according to claim 10, wherein in order to initialize the component to start the main process, the at least one processor, upon execution of the computer program, is configured to:
load the persistent file to acquire a correspondence between a resource and a container of the node.

12. The computer device according to claim 10, wherein the at least one processor, upon execution of the computer program, is configured to:
start RPC service for the main process; and
query, by use of the RPC service of the main process, resource utilization information of the node.

13. The computer device according to claim 8, wherein the at least one processor, upon execution of the computer program, is configured to:
detect, periodically in the node, a resource corresponding to a subprocess that is not started.

14. The computer device according to claim 8, wherein in order to start the RPC service for each started subprocess, the at least one processor, upon execution of the computer program, is configured to:
store, locally in the node, a socket file corresponding to the subprocess where the RPC service is successfully started; and
monitor, by the main process based on a plurality of socket files, states of the subprocess where the RPC service is successfully started.

15. The computer device according to claim 8, the at least one processor, upon execution of the computer program, is configured to:
integrate a plurality of resource device plug-ins into the component based on mechanisms of a multiple process, a RPC communication, and a file monitoring and management.

16. A non-transitory storage medium, storing a computer program that is executable by a processor, wherein upon execution by the processor, is configured to cause the processor to:
initialize a component to start a main process;
define, by means of the main process, a plurality of subprocesses for managing a plurality of resources respectively;
in response to a detection from the main process that a plurality of actual resources is present in a node among the plurality of resources, start a subprocess corresponding to each of the plurality of actual resources, and start Remote Procedure Call (RPC) service for each started subprocess; and
register resources, corresponding to a subprocess where the RPC service is successfully started, to a resource manager by means of the main process, enabling the subprocess where the RPC service is successfully started to manage the plurality of actual resources;
wherein the non-transitory storage medium is further configured to cause the processor to:
defining, by means of the main process, resource names and attributes of preset resource processing interfaces for the plurality of subprocesses respectively.

17. The method according to claim 1, further comprising:
integrating a plurality of resource device plug-ins into the component based on mechanisms of a multiple process, a RPC communication, and a file monitoring and management.

* * * * *